(12) United States Patent
Matsuo et al.

(10) Patent No.: US 11,807,307 B2
(45) Date of Patent: Nov. 7, 2023

(54) VEHICLE BASE STRUCTURE

(71) Applicants: Toyota Jidosha Kabushiki Kaisha, Toyota Aichi-ken (JP); Subaru Corporation, Tokyo (JP)

(72) Inventors: Noriaki Matsuo, Toyota Aichi-ken (JP); Tomohiro Matsumoto, Tokyo (JP)

(73) Assignees: TOYOTA JIDOSHA KABUSHIKI KAISHA, Toyota (JP); SUBARU CORPORATION, Tokyo (JP)

( * ) Notice: Subject to any disclaimer, the term of this patent is extended or adjusted under 35 U.S.C. 154(b) by 16 days.

(21) Appl. No.: 17/392,667

(22) Filed: Aug. 3, 2021

(65) Prior Publication Data

US 2022/0073151 A1    Mar. 10, 2022

(30) Foreign Application Priority Data

Sep. 4, 2020 (JP) .................. 2020-149244

(51) Int. Cl.
*B60J 7/00* (2006.01)
*B62D 25/20* (2006.01)

(52) U.S. Cl.
CPC .................. *B62D 25/20* (2013.01)

(58) Field of Classification Search
CPC . Y02E 60/10; Y02E 60/50; C08J 5/18; H01L 2924/0002; B32B 2266/0278; B60R 19/18; B60R 22/26; B62D 21/11; B62D 25/087; B62D 25/025
See application file for complete search history.

(56) References Cited

U.S. PATENT DOCUMENTS

| | | | | |
|---|---|---|---|---|
| 4,875,733 A * | 10/1989 | Chado | .................. | B62D 29/048 296/198 |
| 5,195,780 A * | 3/1993 | Inoue | .................. | B62D 25/087 280/830 |
| 5,246,264 A * | 9/1993 | Yoshii | .................... | B62D 25/04 296/202 |
| 5,354,115 A * | 10/1994 | Esaki | ................. | B62D 25/2036 296/203.03 |
| 5,472,259 A * | 12/1995 | Akiyama | ............... | B62D 21/11 280/795 |
| 6,073,992 A * | 6/2000 | Yamauchi | .............. | B62D 25/02 296/204 |
| 8,286,980 B2 * | 10/2012 | Onda | ..................... | B60G 3/285 280/124.1 |

(Continued)

FOREIGN PATENT DOCUMENTS

| | | |
|---|---|---|
| CN | 103813955 A | 5/2014 |
| JP | 2004-114789 A | 4/2004 |

(Continued)

*Primary Examiner* — Joseph D. Pape
(74) *Attorney, Agent, or Firm* — Dinsmore & Shohl LLP

(57) ABSTRACT

A vehicle base structure includes a rear member having an attachment portion at which a trailing arm is attached, and a reinforcing member disposed to be overlaid on the rear member. The rear member and the reinforcing member configure at least a part of a reinforcing portion. The reinforcing portion has a tubular shape extending in the vehicle front-rear direction. In at least a part along the vehicle front-rear direction, a cross section of the reinforcing portion perpendicular to the vehicle front-rear direction is a closed cross-sectional shape.

6 Claims, 2 Drawing Sheets

(56) References Cited

U.S. PATENT DOCUMENTS

| | | | |
|---|---|---|---|
| 9,604,672 B2 * | 3/2017 | Kaneko | B62D 21/11 |
| 2008/0284111 A1 | 11/2008 | Sano | |
| 2015/0217810 A1 | 8/2015 | Terada et al. | |

FOREIGN PATENT DOCUMENTS

| | | |
|---|---|---|
| JP | 2007-022294 A | 2/2007 |
| JP | 2008-155706 A | 7/2008 |
| JP | 2008-284944 A | 11/2008 |
| JP | 2010-132026 A | 6/2010 |
| JP | 2013-129207 A | 7/2013 |

* cited by examiner

VEHICLE BASE STRUCTURE

CROSS-REFERENCE TO RELATED APPLICATION

This application claims priority to Japanese Patent Application No. 2020-149244 filed on Sep. 4, 2020, incorporated herein by reference in its entirety.

BACKGROUND

1. Technical Field

The technology of the present disclosure relates to a vehicle base structure in which a trailing arm for linking an axle at a rear side of a vehicle and a vehicle body is attached to the vehicle body.

2. Description of Related Art

Japanese Unexamined Patent Application Publication No. 2010-132026 (JP 2010-132026 A) discloses a base structure of a vehicle that improves supporting strength of a trailing arm. In the base structure of the vehicle, a front end portion of the trailing arm is supported by an attaching bracket.

SUMMARY

A load is input to an attachment portion of the trailing arm from an axle unit that has a suspension. Accordingly, increasing the rigidity of the portion at which the trailing arm is attached is desirable. The present disclosure provides technology for increasing the rigidity of the portion at which the trailing arm is attached.

A vehicle base structure according to a first aspect of the present disclosure includes a rear member having an attachment portion at which a trailing arm is attached, and a reinforcing member disposed to be overlaid on the rear member at least at the attachment portion. The rear member extends in a vehicle front-rear direction. The rear member and the reinforcing member configure at least a part of a reinforcing portion. The reinforcing portion has a tubular shape extending in the vehicle front-rear direction. In at least a part along the vehicle front-rear direction, a cross section of the reinforcing portion perpendicular to the vehicle front-rear direction is a closed cross-sectional shape.

With the vehicle base structure of the first aspect of the present disclosure, a tubular shape having a closed cross-sectional shape is provided in the proximity of an attachment portion for attaching the trailing arm, whereby rigidity around the attachment portion of the trailing arm can be increased. In this configuration, the rigidity around the attachment portion of the trailing arm can be increased through the shape of members around the attachment portion of the trailing arm. Accordingly, additional members for increasing rigidity can be suppressed from being disposed around the attachment portion of the trailing arm.

In the vehicle base structure according to the first aspect of the present disclosure, the rear member may be provided with a bead portion recessed downward in a vehicle up-down direction. The reinforcing member may be configured to cover the bead portion. The reinforcing portion may be configured of the bead portion and the reinforcing member.

In the vehicle base structure according to the first aspect of the present disclosure, the rear member and the reinforcing member may be configured to be joined to each other. A joining portion of the rear member and the reinforcing member may be located adjacent to the closed cross-sectional shape of the reinforcing portion.

The vehicle base structure of the first aspect according to the present disclosure may include a rocker attached outward of the rear member in a vehicle width direction. The rocker may extend in the vehicle front-rear direction of the rear member. At least the part of the reinforcing portion may be further configured of the rocker.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Technical elements of a vehicle base structure according to the present disclosure are listed below. Note that the following technical elements are each independently useful.

In the vehicle base structure according to the first aspect of the present disclosure, a rear member may be provided with a bead portion recessed downward in a vehicle up-down direction. A reinforcing member may be configured to cover the bead portion. A reinforcing portion may be configured of the bead portion and the reinforcing member.

With the vehicle base structure of the first aspect of the present disclosure, a closed cross-sectional shape can be configured by the rear member and the reinforcing member. No components of a vehicle body is disposed directly below the rear member. Thus, in order provide the bead portion protruding downward from the rear member, structures of the vehicle body other than the rear member do not have to be changed.

In the vehicle base structure of the first aspect according to the present disclosure, the rear member and the reinforcing member may be configured to be joined to each other, and a joining portion of the rear member and the reinforcing member may be located adjacent to the closed cross-sectional shape of the reinforcing portion.

With the vehicle base structure of the first aspect of the present disclosure, deformation of the closed cross-sectional shape can be suppressed by the joining portion. Thus, deterioration of the rigidity of the reinforcing portion due to the closed cross-sectional shape being deformed can be suppressed.

The vehicle base structure according to the first aspect of the present disclosure may further include a rocker attached outward of the rear member in a vehicle width direction. The rocker may extend in the vehicle front-rear direction. At least a part of the reinforcing portion may be further configured of the rocker.

With the vehicle base structure of the first aspect of the present disclosure, the rocker disposed in the vehicle body can be used to configure the closed cross-sectional shape of the reinforcing portion. Thus, no dedicated parts need to be disposed to configure the closed cross-sectional shape of the reinforcing portion, besides the reinforcing member.

Figure 1:
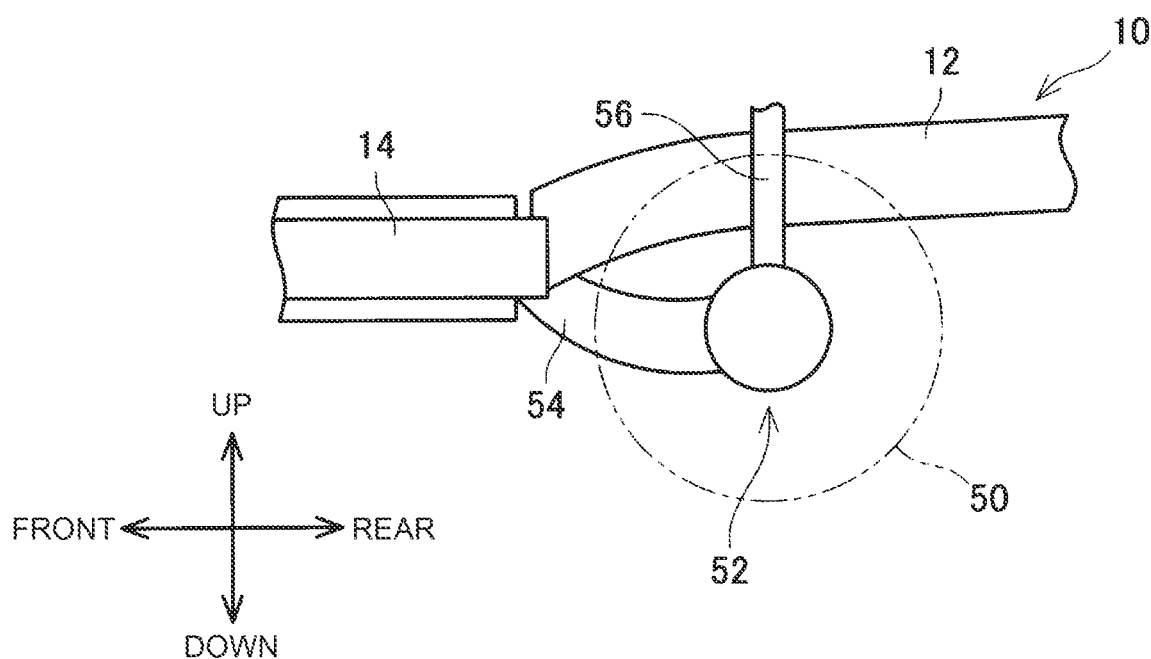
FIG. 1 is a schematic diagram for illustrating an attachment state of a trailing arm according to an embodiment.

As illustrated in FIG. 1, a trailing arm 54 extends forward in the vehicle front-rear direction from an axle unit 52 that supports a wheel 50 disposed on the rear side of the vehicle. The axle unit 52 is a unit for attaching the wheel 50 to the vehicle body such that the wheel 50 is rotatable. The axle unit 52 includes an axle that supports the wheel 50, a suspension unit 56, and so forth. The trailing arm 54 links the axle unit 52, more specifically the suspension unit 56, and a rear member 12 of the vehicle body.

The trailing arm 54 is rockably attached to the rear member 12 at a front end portion of the trailing arm 54. The rear member 12 is a structural member of the vehicle extending in the front-rear direction of the vehicle (hereinafter, referred to simply as "front-rear direction"). In the proximity of a rear end of a floor panel, the rear member 12 is directly joined to an end portion of the floor panel on the outer side in the vehicle width direction, by welding or the like, for example. The rear member 12 is also referred to as a "rear side member".

Figure 3:
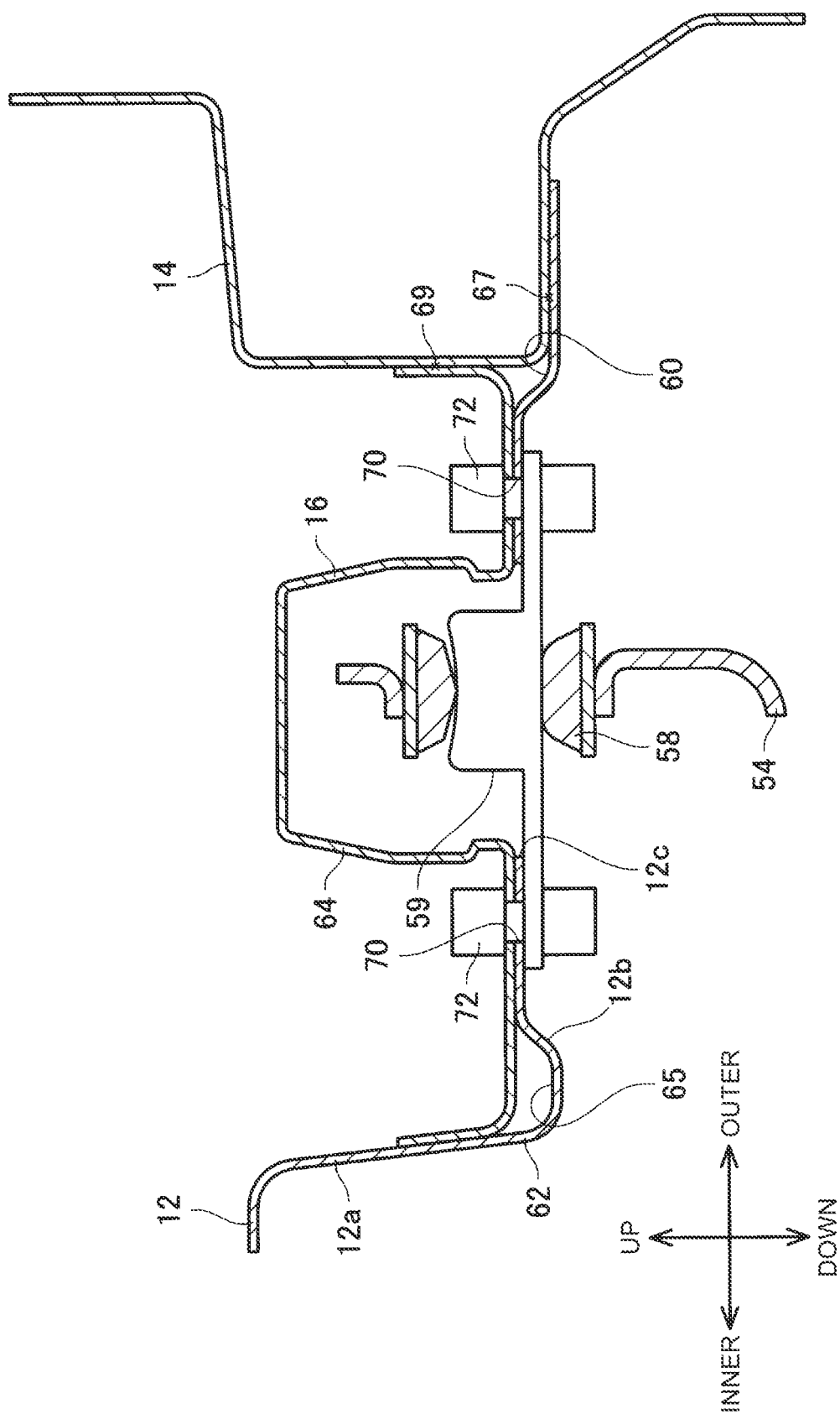
FIG. 3 is a cross-sectional view taken along in FIG. 2.

The rear member 12 is fabricated by deforming one metal sheet by stamping. As illustrated in FIG. 3, the rear member 12 is provided with a side wall 12a that extends in the vehicle up-down direction (a direction perpendicular to both the front-rear direction and the vehicle width direction, hereinafter referred to simply as "upward direction" and "downward direction"), at an inner side in the vehicle width direction. The rear member 12 also has a base portion 12b that spreads from the lower end of the side wall 12a toward the outer side in the vehicle width direction. The side wall 12a is joined to the floor panel. An opening 12c at which the front end portion of the trailing arm 54 is disposed is provided in the base portion 12b.

An attachment structure 10 of the trailing arm 54 is provided with the above-described rear member 12, a reinforcing member 16, and a rocker 14. The reinforcing member 16 is disposed such that at least a part thereof is overlaid on an upper face of the base portion 12b of the rear member 12. The reinforcing member 16 is a member for reinforcing around the opening 12c. The reinforcing member 16 is fabricated by deforming one metal sheet by stamping. The reinforcing member 16 is bent upward at each of an inner side end portion and an outer side end portion in the vehicle width direction. The inner side end portion of the reinforcing member 16 is in contact with a face of the side wall 12a of the rear member 12 on the outer side in the vehicle width direction.

Figure 2:
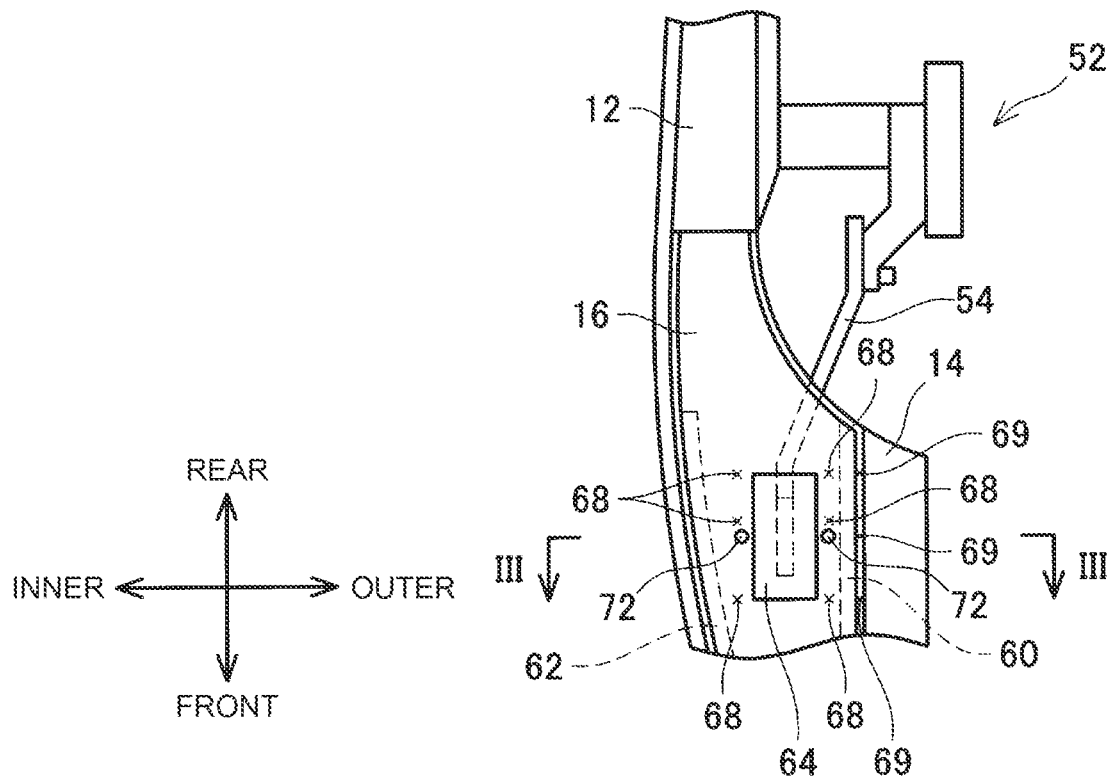
FIG. 2 is a top view of an attachment portion of the trailing arm according to the embodiment.

The reinforcing member 16 covers the opening 12c from above. The reinforcing member 16 has a protruding portion 64 that protrudes upward at the portion covering the opening 12c. The reinforcing member 16 is joined to the rear member 12 by spot welding at a plurality of weld points 68 located around the protruding portion 64, as illustrated in FIG. 2. Note that in a modification, the reinforcing member 16 and the rear member 12 may be joined by another method.

The front end portion of the trailing arm 54 is inserted into the opening 12c, as illustrated in FIG. 3. The protruding portion 64 covers the space above the front end portion of the trailing arm 54 inserted into the opening 12c. The trailing arm 54 is attached to the rear member 12 via a bearing 58 and a rocking shaft 59. The rocking shaft 59 passes through the bearing 58, and is fixed to the rear member 12 at both ends thereof. The rocking shaft 59 is attached to the lower face of the rear member 12 at positions at which the rear member 12 and the reinforcing member 16 are disposed to be overlapped with each other, by fastening members 72 that pass through openings 70 formed in the rear member 12 and in the reinforcing member 16. Thus, the trailing arm 54 is rockably attached to the rear member 12.

The rocker 14 is disposed outward of the rear member 12 and the reinforcing member 16 in the vehicle width direction. The rocker 14 extends in the front-rear direction, as illustrated in FIG. 2. The rocker 14 is a structural member of the vehicle. The rocker 14 is fabricated by deforming one metal sheet by stamping.

The rocker 14 has a recessed shape that opens outward in the vehicle width direction, and flange shapes that are formed by bending each of the upper and lower end portions (outer side end portions in the vehicle width direction) of the recessed shape, as illustrated in FIG. 3. The rocker 14 is in planar contact with each of an outer side face in the vehicle width direction of an outer side end portion of the reinforcing member 16 in the vehicle width direction, and an upper face of an outer side end portion of the base portion 12b of the rear member 12. The rocker 14 is joined to the reinforcing member 16 at a plurality of weld points 69. The rocker 14 is also joined to the rear member 12 at a plurality of weld points 67. The weld points 69 and the weld points 67 are on the same plane when cutting on a cross-section perpendicular to the front-rear direction.

Configuration of Reinforcing Portions

Reinforcing portions 60 and 62 are located at respective ends in the vehicle width direction of the rear member 12 and the reinforcing member 16. The reinforcing portion 62 located inward of the vehicle is configured of a part of the rear member 12 and a part of the reinforcing member 16. The reinforcing portion 62 has a closed cross-sectional shape at a cross-section perpendicular to the front-rear direction. The part of the rear member 12 constituting the reinforcing portion 62 has a bead portion 65 that is recessed downward at the base portion 12b. The bead portion has a recessed shape. The reinforcing portion 62 extends in the front-rear direction, as indicated by a dotted line in FIG. 2. The bead portion 65 is formed over the entire length in the front-rear direction of the reinforcing portion 62. The closed cross-sectional shape of the reinforcing portion 62 at cross-sections perpendicular to the front-rear direction is continuous.

The reinforcing portion 60 located at the outer side in the vehicle width direction is configured of a part of the rear member 12, a part of the reinforcing member 16, and a part of the rocker 14, as illustrated in FIG. 3. The reinforcing portion 60 has a closed cross-sectional shape at a cross-section perpendicular to the front-rear direction. The closed cross-sectional shape is configured of the rear member 12, the reinforcing member 16, and the rocker 14. The rear member 12 constituting the reinforcing portion 60 is bent so as to be distanced downward from the reinforcing member 16. The reinforcing portion 60 extends in the front-rear direction, as indicated by a dotted line in FIG. 2. The closed cross-sectional shape of the reinforcing portion 60 at cross-sections perpendicular to the front-rear direction is continuous over the entire length of the reinforcing member 16 in the front-rear direction.

The weld points 68 that join the rear member 12 and the reinforcing member 16 are located adjacent to the reinforcing portions 60 and 62. The weld points 68 may follow the reinforcing portions 60 and 62. The weld points 67 that join the rear member 12 and the rocker 14, and the weld points 69 that join the rocker 14 and the reinforcing member 16, are located adjacent along the reinforcing portion 60.

In the attachment structure 10 of the trailing arm 54, the rigidity around the attachment portion of the trailing arm 54 can be increased by forming the reinforcing portions 60 and 62, which are tubular shapes having closed cross-sectional shapes around the attachment position of the trailing arm 54.

The reinforcing portions 60 and 62, which are tubular shapes having closed cross-sectional shapes, extend in the front-rear direction. Accordingly, the rear member 12 and the reinforcing member 16 can be suppressed from deforming at positions at which the fastening members 72 are disposed under the load placed thereupon by the trailing arm 54. By configuring the reinforcing portions 60 and 62 from the rear member 12, the reinforcing member 16, and the rocker 14, other members need not be disposed to improve rigidity. As a result, increased weight of the vehicle, costs of the vehicle or increase in manufacturing processes, can be suppressed.

The rear member 12 is deformed downward at the reinforcing portions 60 and 62, to define tubular shapes. No components of the vehicle body is disposed directly below the rear member 12. Accordingly, the reinforcing portions 60 and 62 can be configured by forming shapes protruding downward from the base portion 12*b* by utilizing the space directly below the rear member 12. Thus, the reinforcing portions 60 and 62 can be configured without changing the layout of structures and parts of the vehicle body other than the rear member 12.

Locating the weld points 68 of the rear member 12 and the reinforcing member 16 adjacent to the reinforcing portions 60 and 62 facilitates forming the closed cross-sectional shapes of the reinforcing portions 60 and 62. Forming the closed cross-sectional shapes suppresses reduction in rigidity of the reinforcing portions 60 and 62. This is true for the weld points 69 of the reinforcing member 16 and the rocker 14, and the weld points 67 of the rear member 12 and the rocker 14 as well.

Note that an arrangement may be made in which one of the reinforcing portions 60 and 62 is omitted. At least one of the reinforcing portions 60 and 62 does not need to have a closed cross-sectional shape at a cross-section perpendicular to the front-rear direction, at a part in the front-rear direction. Further, the tubular shapes of the reinforcing portions 60 and 62 may be other cross-sectional shapes than those illustrated in FIG. 3, such as cylindrical shapes, polygonal shapes, or the like, for example.

Technical elements described in the present specification or the drawings exhibit technical utility, either singularly or through various types of combinations, and do not limit combinations set forth in the Claims at the time of application. Also, the technology exemplified in the present specification or the drawings may achieve a plurality of objects simultaneously, and achieving one of these objects in itself has technical utility.

What is claimed is:

1. A vehicle base structure, comprising:
   a rear member having an attachment portion at which a trailing arm is attached, the rear member extending in a vehicle front-rear direction; and
   a reinforcing member disposed to be overlaid on an upper face of the rear member at least at the attachment portion, wherein the rear member and the reinforcing member configure at least a part of a reinforcing portion, the reinforcing portion having a tubular shape extending in the vehicle front-rear direction, and in at least a part along the vehicle front-rear direction, a cross section of the reinforcing portion perpendicular to the vehicle front-rear direction is a closed cross-sectional shape.

2. The vehicle base structure according to claim 1, wherein:
   the rear member is provided with a bead portion recessed downward in a vehicle up-down direction;
   the reinforcing member is configured to cover the bead portion; and
   the reinforcing portion is configured of the bead portion and the reinforcing member.

3. The vehicle base structure according to claim 1 wherein:
   the rear member and the reinforcing member are configured to be joined to each other; and
   a joining portion of the rear member and the reinforcing member are located adjacent to the closed cross-sectional shape of the reinforcing portion.

4. The vehicle base structure according to claim 1, further comprising: a rocker attached outward of the rear member in a vehicle width direction, the rocker extending in the vehicle front-rear direction of the rear member, wherein at least the part of the reinforcing portion is further configured of the rocker.

5. The vehicle base structure according to claim 1, wherein:
   the attachment portion provides an opening and the reinforcing member covers the opening from above.

6. The vehicle base structure according to claim 1, wherein:
   the rear member has a side wall; and
   the reinforcing member is bent upward at an inner side end portion in a vehicle width direction and the inner side end portion is in contact with a face of the side wall on an outer side in the vehicle width direction.

\* \* \* \* \*